(12) United States Patent
Budroweit

(10) Patent No.: US 12,284,080 B2
(45) Date of Patent: Apr. 22, 2025

(54) RADIATION TOLERANT SOFTWARE DEFINED RADIO DEVICE FOR MULTI-BAND RADIO APPLICATIONS IN SPACE SYSTEMS

(71) Applicant: Deutsches Zentrum für Luft- und Raumfahrt e.V., Bonn (DE)

(72) Inventor: Jan Budroweit, Bonn (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 350 days.

(21) Appl. No.: 17/874,535

(22) Filed: Jul. 27, 2022

(65) Prior Publication Data

US 2024/0039790 A1 Feb. 1, 2024

(51) Int. Cl.
*H04B 1/40* (2015.01)
*H04L 41/0866* (2022.01)

(52) U.S. Cl.
CPC ........... *H04L 41/0866* (2013.01); *H04B 1/40* (2013.01)

(58) Field of Classification Search
None
See application file for complete search history.

(56) References Cited

U.S. PATENT DOCUMENTS

| | | | | |
|---|---|---|---|---|
| 7,047,029 B1* | 5/2006 | Godwin | ................ | H04L 1/0009 455/512 |
| 7,151,929 B1* | 12/2006 | Jenkin | ................ | H04B 7/18582 455/430 |
| 7,412,163 B2* | 8/2008 | Wu | ......... | G03B 17/00 16/221 |
| 7,428,405 B2* | 9/2008 | Kim | ......... | B64G 3/00 455/430 |
| 7,606,567 B1* | 10/2009 | Katz | .................. | H04B 7/18513 455/452.2 |
| 8,121,036 B2* | 2/2012 | Liu | .......... | H04L 45/24 370/338 |
| 8,352,651 B2* | 1/2013 | Parfitt | .................. | G05B 19/054 326/38 |
| 9,367,043 B2* | 6/2016 | Baba | ...................... | G04C 10/02 |
| 9,461,732 B2* | 10/2016 | Buehler | ............. | H04B 7/18515 |
| 9,485,010 B1* | 11/2016 | Chen | .................... | H04B 7/1851 |
| 10,069,918 B2* | 9/2018 | Harter | ..................... | H04L 67/12 |
| 10,270,520 B2* | 4/2019 | Arapoglou | ........... | H04B 7/0626 |

(Continued)

*Primary Examiner* — Tuan A Tran
(74) *Attorney, Agent, or Firm* — Christensen, Fonder, Dardi PLLC; Andrew H. Auderieth; Peter S. Dardi

(57) ABSTRACT

The radiation tolerant software defined radio device for multi-band radio applications in space systems comprising components for terrestrial application not qualified officially for use in space, the components comprising
  a power supply,
  a base band processor, such as e.g. a processor of the Xilinx SoC (system-on-chip) product family Zynq-7000,
  volatile and non-volatile memories, such as e.g. SDRAM and NAND flash memories,
  a radio frequency transceiver, such as e.g. the RF agile transceiver AD9361 from Analog Devices, allowing for software-based reconfiguration of various radio frequency characteristics, such as local oscillator frequency, analog filter band width, gain control of input and output amplifiers, sample rates of analog-to-digital converters and digital-to-analog converters, and
  mitigation mechanisms on hardware and software level for autonomously recovering to a nominal state.

10 Claims, 1 Drawing Sheet

(56) References Cited

U.S. PATENT DOCUMENTS

| | | | |
|---|---|---|---|
| 10,302,398 B2 * | 5/2019 | Burke | F41G 9/00 |
| 10,587,335 B1 * | 3/2020 | Choi | H04B 7/18513 |
| 10,908,289 B2 * | 2/2021 | Margaritova | G01S 5/145 |
| 11,817,869 B2 * | 11/2023 | Moehlmann | H03L 7/0992 |
| 11,971,490 B2 * | 4/2024 | Reis | G01S 19/00 |
| 2003/0054814 A1 * | 3/2003 | Karabinis | H04W 16/02 |
| | | | 455/427 |
| 2019/0271779 A1 * | 9/2019 | Margaritova | G01S 17/36 |
| 2024/0235666 A1 * | 7/2024 | Parr | H04W 52/0229 |

\* cited by examiner

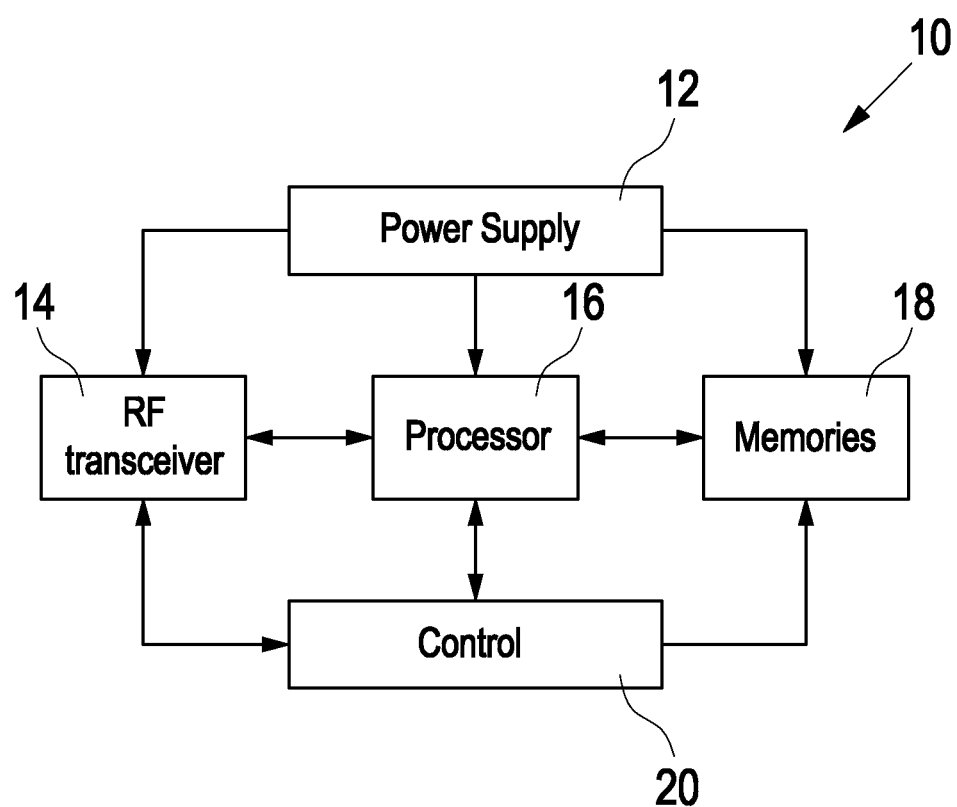

RADIATION TOLERANT SOFTWARE DEFINED RADIO DEVICE FOR MULTI-BAND RADIO APPLICATIONS IN SPACE SYSTEMS

FIELD OF THE DISCLOSURE

The present invention relates to a radiation tolerant software defined radio device for multi-band radio applications in space systems. Specifically, the present invention relates to radio devices to be used in space systems in which electrical components for terrestrial applications are used which are not qualified officially for use in space.

BACKGROUND

Software-defined radio devices for space systems have become of great interest in the past decades due to their flexible reconfiguration capabilities on digital processing. Due to the rapid development of new technologies according to Moor's-law, cognitive radio systems have become much more powerful and even capable of realizing multi-band operation purposes with specific radio frequency integrated circuit devices which have been mainly developed for mobile services such as 4G or beyond. Using these technologies in space application would be of great benefit since radio systems are then much smaller and more feasible for operating multiple applications in different frequency bands by simple software-related reconfiguration. Obviously, such technologies are not designed for the harsh environment in space, specifically for radiation.

SUMMARY

The present disclosure describes the development of a highly integrated, radiation tolerant SDR system for multi-band radio applications in space systems. Due to the required state-of-the-art technologies, the avoidance of commercial of-the-shelf electronic devices is not feasible but on the other hand probably not mandatory. To ensure a reliable system that is capable of withstanding the constant radiation that will be present in space and the resulting effects on a system, the invention suggests specific mechanisms to safeguard functionality or recovery of functionality of the space system.

The invention provides a radiation tolerant software defined radio device for multi-band radio applications in space systems comprising components for terrestrial application not qualified officially for use in space, the components comprising
  a power supply,
  a base band processor, such as e.g. a processor of the Xilinx SoC (system-on-chip) product family Zynq-7000,
  volatile and non-volatile memories, such as e.g. SDRAM and NAND flash memories,
  a radio frequency transceiver, such as e.g. the RF agile transceiver AD9361 from Analog Devices Inc., allowing for software-based reconfiguration of various radio frequency characteristics, such as local oscillator frequency, analog filter band width, gain control of input and output amplifiers, sample rates of analog-to-digital converters and digital-to-analog converters, and
  mitigation mechanisms on hardware and software level for autonomously recovering to a nominal state.

According to another aspect of the present invention, the mitigation mechanisms comprise
  monitoring changes in register configurations of the radio frequency transceiver and continuously reading driver parameters for adjusting the transmitting power of the radio frequency transceiver.

According to a further aspect of the present invention, the mitigation mechanisms comprise
  detecting abnormal current and voltage conditions captured by the base band processor.

According to another aspect of the present invention, the mitigation mechanisms comprise
  monitoring several device temperatures and forcing a reset of the device if at least one of the device temperatures exceeds a threshold value.

According to still a further aspect of the present invention, the mitigation mechanisms comprise
  monitoring software processes by means of a software watchdog monitoring processes and regular or irregular intervals and configures to trigger a kernel watchdog of the based band processor, wherein the software watchdog starts as a daemon and monitors processes and system resources, wherein in the event of an error, a repair script is started which will recover the erroneous process and wherein the kernel watchdog performs a reboot, i.e. not a reset, of the system, if errors are not fixed or the software watchdog itself crashes.

According to another aspect of the present invention, the mitigation mechanisms comprise
  triggering a hardware watchdog device of the device by a process send a heartbeat signal comprising pulses for e.g. every 200 ms, to the watchdog device input, wherein, if the whole software architecture of the operating system is not working properly anymore and if neither the software watchdog nor the kernel watchdog are capable of resolving this issue, it is assumed also that the heartbeat signal will disappear and will lead the hardware watchdog to force a reset.

Moreover, in one further aspect of the present invention, the mitigation mechanisms comprise
  cross-checking files and/or partitions with a hash sum wherein this is usually intended for boot files and/or images such as the kernel, ram disc image and Bootbin, wherein for these files and their duplicates, there is a single hash file with the hashes of the respective files, and wherein at regular or irregular intervals, these files are checked and in the event of an error, a redundant file with a correct hash sum is used to overwrite the corrupted file and/or partition.

The features according to two or more of the individual aspects of the invention can also be realized in combination with each other.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1 depicts a block diagram of the circuitry for a radiation tolerant software defined radio device, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

In the following, individual features of the device of the invention will be explained in more detail.

1) Voltage and Current Monitoring with a High Level of Accuracy (at any Voltage Level)

Since systems often operate with different voltages (in the case of the system developed here, there are ten different voltage levels), voltage and current deviations may not be detected via the main supply. In case of e.g. an unintentional voltage increase in one of the lower voltage levels, this deviation could not be detected in the main supply and therefore individual components could be destroyed and the entire system could fail. In the device, all voltage levels are linked via a switching logic, whereby they are monitored independently. The system can determine voltage and current values and react automatically in case of deviations, thus avoiding destruction.

2) Configuration Monitoring of Memory Elements (Memory for System Configuration, for Booting and for Executing System Properties)

This monitoring is a software implementation of the system. It continuously reads memory areas and compares them with expected values. In the event of a change, a comparison is made with multiple redundancy (e.g. triple redundancy) and a voting system is used to overwrite and reinitialize the faulty partition or memory areas. This is especially crucial for the storage media of the device that are required to start and initialize the system, thus avoiding a deadlock, i.e. a recurring error loop.

3) RF Transceiver Configuration Monitoring for RF Specification (Both Setting of Relevant ICs and RF Data In the case of the radio system described here, a technology new to space applications is used in the form of a high-frequency IC designed for terrestrial applications, which was not developed for space applications. Since this technology allows extreme flexibility of the system, configurable via software, failure cases or incorrect configurations are also to be expected here, which can contribute to the faulty functioning of the system. To counteract this, specific procedures and mechanisms have been developed (implemented via software) to continuously monitor the states of the technology and, in the event of a failure, automatically detect and repair it.

As an example, for the high-frequency transceiver, the AD9361 from Analog Devices Inc. can be mentioned. The AD9361 is a complex device with which it is possible, by means of software-based programming, to make various settings that affect the device's characteristics. The special feature concerns the adjustability of the high frequency characteristics, i.e. the transmit/receive frequencies, the sampling rates, the filter bandwidths, the transmit power and much more. Radiation influences can not only affect these functions in the long term, but also under certain circumstances the settings can also be changed, which can then lead to a functional failure of the radio system. For example, under the influence of radiation, the reception frequency can change, which means that desired signals can no longer be received. To ensure reliable operation of this device, various mechanisms have been developed and implemented in the system that can detect and automatically correct errors, as described below:

a) The AD9361 has a large register bank in which most functions are set. So that the user does not have to write to individual registers, the manufacturer has developed a driver with which the user can change settings. According to the invention, continuous register states are checked and changes are noticed. It must be taken into account that radiation influences can also cause certain registers to change continuously (e.g., calibration registers, temperature readings, etc.). According to the invention, these radiation influences have been specifically masked out. In addition, radiation tests on the device have shown that a large number of register changes do not necessarily mean a failure of the function or an adjustment of its properties. For this purpose, a driver-based mitigation mechanism is implemented according to the invention, which checks whether the functionality is still guaranteed in the event of a register change.

b) Driver-based verification

In case of a change in the configuration registers, a mechanism checks the driver-based function of the device by reading all function states and comparing them with the original parameters. Essentially, the driver translates register states, which allows for user-friendly operation. In the event of a malfunction, the mechanism can use two methods to automatically correct the error condition. On the one hand, it writes the original configuration to the device and revalidates its properties, and on the other hand, in case of an unsuccessful reconfiguration, the mechanism triggers a special reset PIN, which then receives its original configuration from the higher-level system. Tests have shown that such a situation may well occur, in which the block was no longer writable, for example.

c) Cross-verification of the transmit/receive signals

During tests performed, other effects were also observed, whereby transmitted and received signals did not meet the expected criteria despite valid states in the configuration (see a) and b) above). Although this case was rare, it should also be possible to detect and correct it. For this purpose, one can make use of the dual transmit and receive function of the function block (which has two independent transmit and receive channels). In addition, another module is used, so that four transmit and receive paths are available, which can also be switched to different inputs and outputs. In the rare case of an error that cannot be detected by measures according to a) and b), a process is provided according to the invention in which a pilot signal is transmitted back and forth between the two modules, which is evaluated by the system. If errors are detected in the process, this indicates a failure, which in most cases is correlated by measures according to a) and b). If the methods according to a) and b) do not detect an error, this can be detected via this exchanged pilot signal and the system can reconfigure the module and reset it to the initial state.

4) Function Monitoring of the Executing Software (if Parts of the Software Crash, they can be Restored, or the System Restarts Itself)

Since error cases can occur in different areas of the software or function to be executed, and independently of the technology described above, various methods have been developed, implemented and tested so that the system independently detects error cases and performs interventions to correct them or, in case of doubt, to restart the system.

5) Function Monitoring of the Overall System Performance (Implemented in the Form of a Watchdog that Expects a Heartbeat Signal from the System and Restarts the System if this is No Longer Sent)

As described above, a switching logic is implemented that enables the "hard" restart of the system. For this purpose, a module is used that waits for a defined signal from the system (heartbeat signal). If this disappears, the system will perform a reset by disconnecting the internal voltage supply and re-enabling it after a fixed defined time.

The present invention will further be described with reference to FIG. 1 in which a block diagram of the circuitry for a radiation tolerant software defined radio device is shown.

According to FIG. 1, the radiation tolerant software defined radio device 10 for multi-band radio applications in space systems comprises a power supply 12 providing a plurality of voltage levels to be supplied to an RF transceiver 14, a processor 16, and volatile and non-volatile memories 18. For the RF transceiver 14 the RF agile transceiver AD9361 from Analog Devices Inc. can be used. The processor 16 can be one of the Xilinx SoC product family Zynq-7000, while for the memories SDRAM and NAND flash memories can be used.

By way of a software-based control 20, the RF transceiver 20, the processor 16, and the memories 18 can be monitored and specific mechanisms can be performed as described above.

The present invention can be used in the technical field of air and space and specifically for satellite communication, satellite navigation, earth observation, and aerospace safety as well as in devices and arrangements with rather high or highest radiation exposure (particle accelerators and medical devices).

In addition to the above disclosure, the doctoral dissertation of Budroweit, J. (2020. *Development of a highly integrated and radiation-tolerant software-defined radio platform for multi-band radio applications in space systems* (Doctoral dissertation, Technische Universität Hamburg), is incorporated herein by reference in its entirety. This document discusses implementation of the concepts described herein. In particular Chapter 6 of this Thesis provides a particular example of an embodiment with specific circuit diagrams provided.

What is claimed is:

1. A radiation tolerant software defined radio device for multi-band radio applications in space systems comprising components designed for terrestrial application, the components comprising
    a power supply,
    a base band processor,
    volatile and non-volatile memories,
    a radio frequency transceiver having a driver allowing for software-based reconfiguration of various radio frequency characteristics including local oscillator frequency, analog filter bandwidth, gain control of input and output amplifiers, sample rates of analog-to-digital converters and digital-to-analog converters, and
    mitigation mechanisms on hardware and software level for autonomously recovering to a nominal state wherein the hardware level mitigation mechanism comprises confirming that voltage fluctuations do not exceed component voltage tolerances and software level mitigation mechanism comprise verification of the continued presence of a heartbeat signal and restarting the system if the heartbeat signal is no longer present.

2. The radiation tolerant software defined radio device according to claim 1, wherein the mitigation mechanisms comprise
    monitoring changes in register configurations of the radio frequency transceiver and continuously reading parameters for adjusting the transmitting power of the radio frequency transceiver, the parameters being provided by the driver of the radio frequency transceiver.

3. The radiation tolerant software defined radio device according to claim 1, wherein the mitigation mechanisms comprise
    detecting abnormal current and voltage conditions captured by the base band processor.

4. The radiation tolerant software defined radio device according to claim 1, wherein the mitigation mechanisms comprise
    monitoring several device temperatures and forcing a reset of the device if at least one of the device temperatures exceeds a threshold value.

5. The radiation tolerant software defined radio device according to claim 1, wherein the mitigation mechanisms comprise
    monitoring software processes by means of a software watchdog monitoring processes and regular or irregular intervals and configures to trigger a kernel watchdog of the based band processor, wherein the software watchdog starts as a daemon and monitors processes and system resources, wherein in the event of an error, a repair script is started which will recover the erroneous process and wherein the kernel watchdog performs a reboot, i.e. not a reset, of the system, if errors are not fixed or the software watchdog itself crashes.

6. The radiation tolerant software defined radio device according to claim 1, wherein the mitigation mechanisms comprise
    triggering a hardware watchdog device of the device by a process send a heartbeat signal comprising pulses for e.g. every 200 ms, to the watchdog device input, wherein, if the whole software architecture of the operating system is not working properly anymore and if neither the software watchdog nor the kernel watchdog are capable of resolving this issue, it is assumed also that the heartbeat signal will disappear and will lead the hardware watchdog to force a reset.

7. The radiation tolerant software defined radio device according to claim 1, wherein the mitigation mechanisms comprise
    cross-checking files and/or partitions with a hash sum wherein this is usually intended for boot files and/or images such as the kernel, ram disc image and Bootbin, wherein for these files and their duplicates, there is a single hash file with the hashes of the respective files, and wherein at regular or irregular intervals, these files are checked and in the event of an error, a redundant file with a correct hash sum is used to overwrite the corrupted file and/or partition.

8. The radiation tolerant software defined radio device according to claim 1, wherein the mitigation mechanisms comprise cross-verification of a transmit and a receive signal by transmitting a pilot signal between a first module and a second module.

9. The radiation tolerant software defined radio device according to claim 8, wherein if an error is detected in the pilot signal, the device is reset to an initial state.

10. The radiation tolerant software defined radio device according to claim 1, wherein the mitigation mechanisms comprise, in the event of an unsuccessful reconfiguration, triggering a reset PIN that receives an original configuration from a higher-level system.

\* \* \* \* \*